United States Patent
Mott

[11] 3,904,964
[45] Sept. 9, 1975

[54] PARAMETRIC AMPLIFIER ALIGNMENT SYSTEM

[75] Inventor: Murray H. Mott, San Diego, Calif.

[73] Assignee: The United States of America as represented by the Secretary of the Navy, Washington, D.C.

[22] Filed: Mar. 7, 1974

[21] Appl. No.: 449,160

[52] U.S. Cl................................ 325/67; 324/57 SS
[51] Int. Cl.² ........................................ G01R 27/00
[58] Field of Search............ 324/57 R, 57 SS, 58 R, 324/58 SS; 325/67, 363; 331/177 R, 331/177 V, 178

[56] References Cited
UNITED STATES PATENTS

| | | | |
|---|---|---|---|
| 2,898,511 | 8/1959 | Axelrod et al. | 331/178 |
| 2,905,894 | 9/1959 | Rudmann, Jr. | 325/363 X |
| 3,210,656 | 10/1965 | Lent | 324/57 SS |
| 3,253,216 | 5/1966 | Feldman | 324/57 SS |
| 3,427,536 | 2/1969 | Wainwright | 324/57 SS |

*Primary Examiner*—Benedict V. Safourek
*Attorney, Agent, or Firm*—R. S. Sciascia; G. J. Rubens; T. M. Phillips

[57] ABSTRACT

The system provides a sweep signal generator for generating a test signal which is fed to the off-line parametric amplifier (paramp). The paramp output is detected and provides a signal for display equipment. Means are also provided for the calibration of the display to obtain paramp gain-bandwidth information.

5 Claims, 5 Drawing Figures

PARAMETRIC AMPLIFIER ALIGNMENT SYSTEM

BACKGROUND OF THE INVENTION

The present invention relates to parametric amplifier alignment systems and more particularly to an alignment system wherein the paramp being tested is swept with an RF signal.

For optimum performance, a paramp should be mounted as close as possible to the microwave securing antenna. This causes a problem in testing and tuning the paramp, especially on board ships where the antenna is mounted on a mast with limited accessibility. Because paramp operating characteristics change with age, and change with changes in temperature, constant testing and alignment are required. The present invention provides for the testing and alignment of a paramp mounted integrally with a receiving antenna.

SUMMARY OF THE INVENTION

The present invention provides a means for testing and aligning a remotely located parametric amplifier by generating a sweep signal, inserting the proper signals to the off-line paramp, detection of the paramp output and displaying the paramp gain-bandwidth information to aid in determining its operating characteristics. There are three modes of operation. When in the calibrate mode, a voltage controlled oscillator ramp generator developes ramp and modulating signals. The ramp signal is fed to the horizontal input of a display oscilloscope. The ramp and modulating signals are fed to a voltage controlled oscillator which in turn generates an rf sweep signal that is detected and amplified to provide a reference signal which is fed to the vertical input of the display oscilloscope. One important feature of the invention is the ability to adjust the linearity of the sweep signal to match the tuning curve of the voltage controlled oscillator. When in the align single state mode, the rf sweep signal is fed to the off-line paramp input, with only one stage operating, the output of the paramp is detected and fed to the vertical input of the display oscilloscope. When in the align all mode, all stages are operating and the paramp is aligned by adjusting the paramp by remote control.

Accordingly, an object of the invention is the provision of a testing and aligning system for a parametric amplifier.

Another object of the invention is the provision of a testing and aligning system for a parametric amplifier which eliminates the need for bulky test equipment that must be hand carried to the antenna site.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 3 is a side view of the frequency marker of FIG. 1, and

FIG. 4 is an end view of the frequency marker of FIG. 3.

FIG. 5 is a 3/4 view of the frequency marker of FIGS. 3 and 4.

DESCRIPTION OF THE PREFERRED EMBODIMENTS

Figure 1:
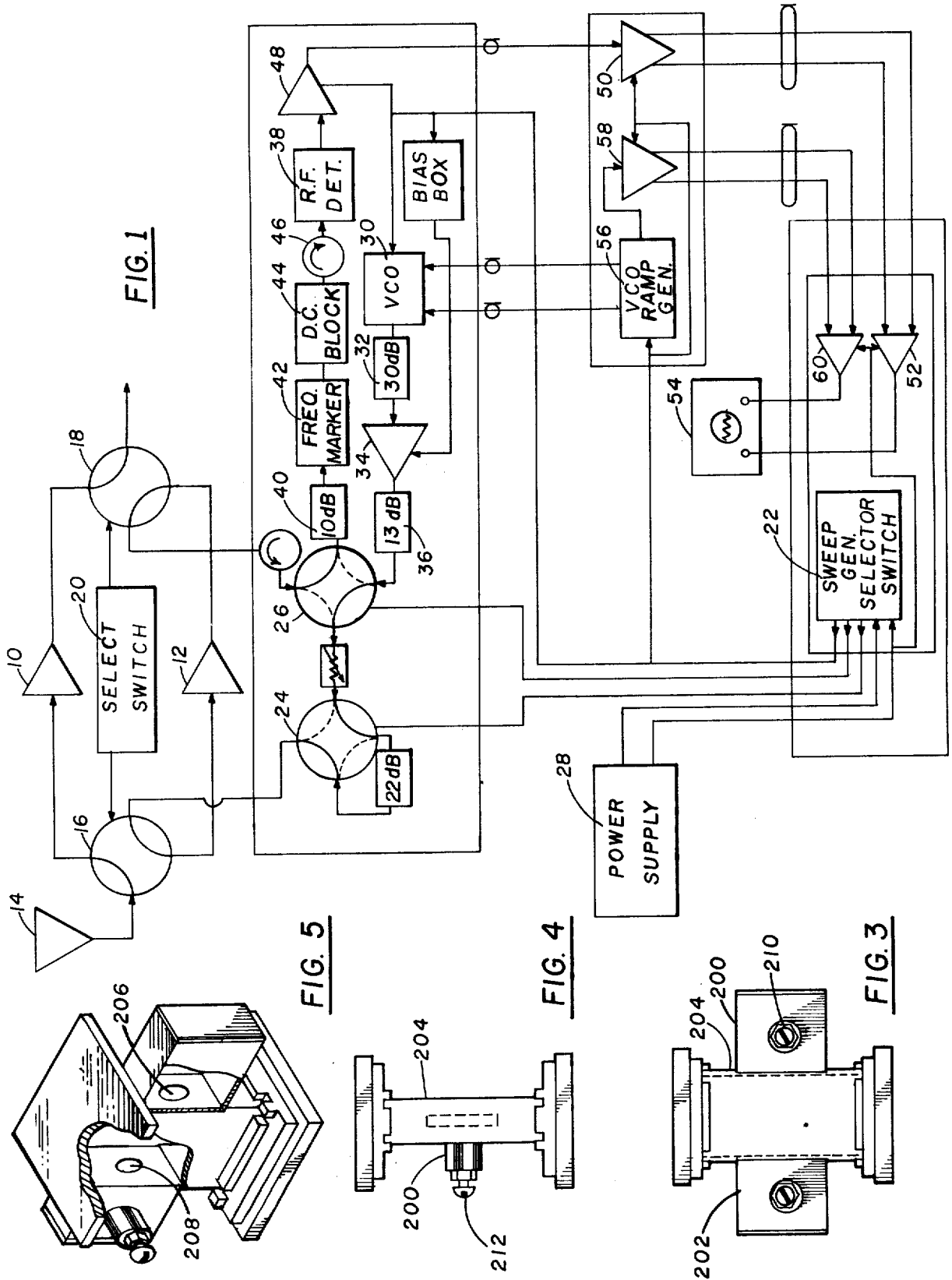
FIG. 1 is a block diagram of the testing and aligning system.

Referring now to FIG. 1 there is shown paramps 10 and 12 which can be connected to a receiving antenna 14 by means of coaxial switch 16 and to a receiver (not shown) by means of coaxial switch 18. With switches 16 and 18 in the position shown, the received signal from antenna 14 would be amplified by paramp 10 and fed to a receiver (not shown). Switches 16 and 18 are controlled by on-line select switch 20. Paramps 10 and 12 should be physically located as close as possible to antenna 14 to reduce the length of connecting coaxial line (or waveguide) to a minimum.

In order to test and align either of paramps 10 and 12, they must be off-line. In the position shown, paramp 10 is on-line and paramp 12 is off-line.

The overall operation of the paramp alignment system is controlled by means of control selector switch 22. Selector switch 22 is used to control coaxial switches 24 and 26 and to supply operating voltages from power supply 28.

Voltage controlled oscillator 30 provides the rf sweep signal for testing and calibration. The rf signal is fed to coaxial switch 26 through attenuator 32, a tunnel diode amplifier 34 and another attenuator 36. The rf signal to be detected is fed from coaxial switch 26 to rf detector 38 through attenuator 40, frequency marker 42, blocking capacitor 44 and isolator 46. The video output from rf detector 38 is amplified in video amplifier 48 and fed to a balanced line driver 50. Balanced line driver 50 feeds balanced-to-unbalanced adapter 52 which provides the vertical input to display scope 54. VCO 30 control signals are provided by ramp voltage generator 56. The ramp voltage is also fed to the horizontal input of display scope 54 through balanced line drivers 58 and unbalanced adapter 60.

Figure 2:
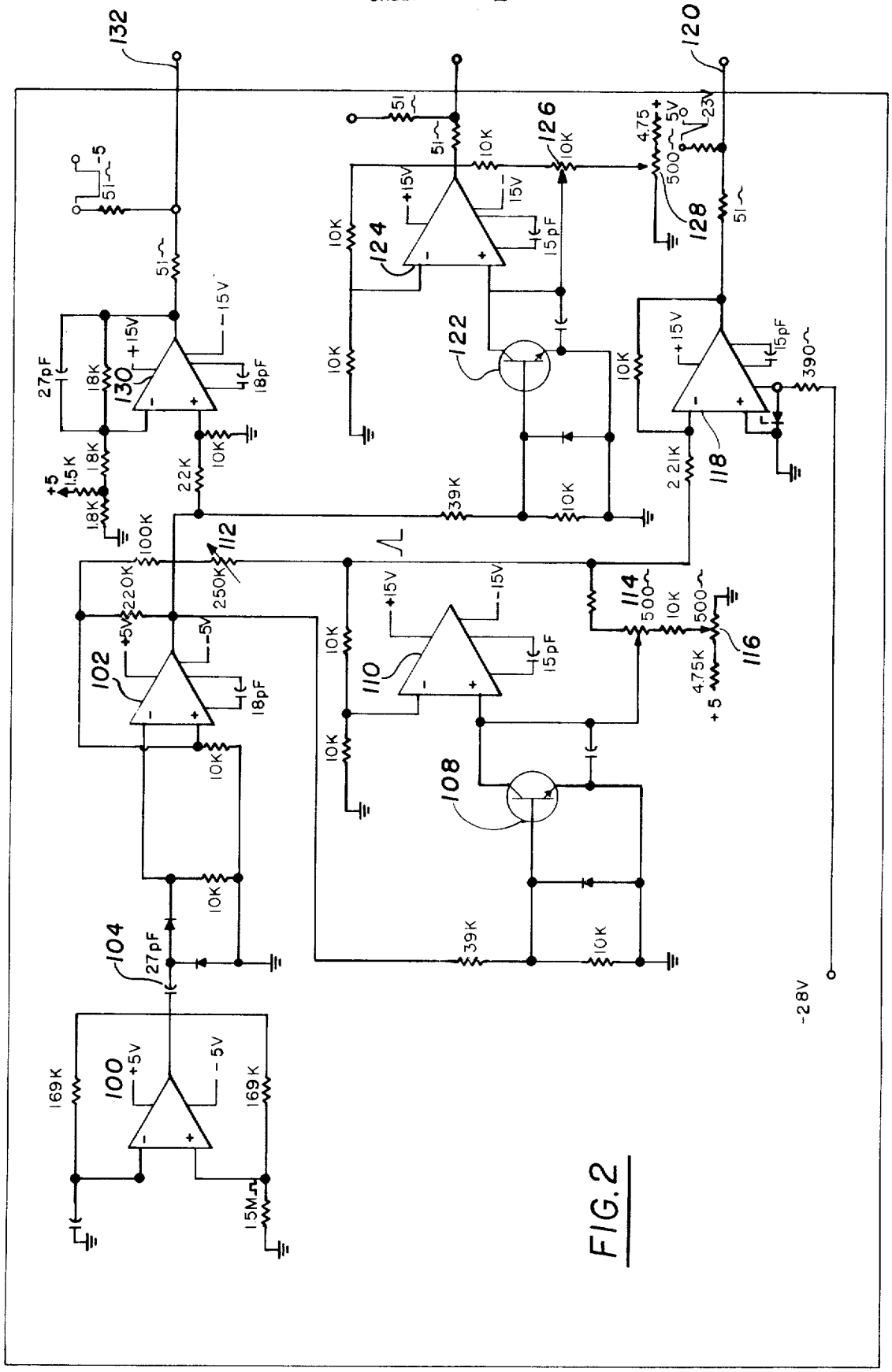
FIG. 2 is a circuit diagram of the sweep signal generator of FIG. 1.

Referring now to FIG. 2 wherein the ramp generator 56 is shown in schematic form, a free running multivibrator 100 is coupled to operational amplifier 102 operating as a comparator circuit by means of coupling capacitor 104. An output pulse will appear at the output of comparator 102 at a frequency determined by the operating frequency of multivibrator 100.

The output pulses from comparator 102 are fed to the base of transistor 108 which is connected to operational amplifier 110 to function together as a sawtooth generator. The characteristics of the resulting sawtooth are determined by the values of resistors 112, 114 and 116. Resistor 116 establishes the sweep slope, resistor 114 linearity adjustment to match the tuning curve of the oscillator 30 (FIG. 1), and resistor 112 controls the amplitude of the sawtooth. The sawtooth voltage is applied to the negative input of operational amplifier 118 operating as an inverter which is connected to provide −23 volt amplitude signal at output terminal 120 which is the sweep voltage to VCO 30 (FIG. 1). Transistor 122 and operational amplifier 124 are connected to function as a sawtooth generator in much the same manner as transistor 108 and operational amplifier 110, using the same pulse output from latching comparator 102. The characteristics of the resulting sawtooth at terminal 129 are determined by the values of variable resistors 112, 126 and 128. Resistor 128 establishes the sweep slope and resistor 126 provides linearity adjustment of the slope. Because of its feedback arrangement resistor 112 also controls the amplitude.

The sawtooth voltage is fed to the horizontal input of scope 54 (FIG. 1).

The output pulse from comparator 102 is also fed to operational amplifier 130 and provides a pulse modulated signal at terminal 132 which is fed as the on-off control signal for oscillator 30 (FIG. 2).

With multivibrator 100 operating at 100Hz, and using the values shown, the circuit has been found to operate satisfactorily.

In order that the scope can be calibrated, the novel frequency marker 42 (FIG. 1) are shown in detail in FIGS. 3, 4, and 5. Two cavity resonators 200 and 202 are coupled to a waveguide. The length of resonator 200 is slightly longer than resonator 202 and each is coupled to waveguide 204 through small apertures 206 and 208, respectively. Each cavity is tuned by means of the tuning slugs 210 and 212, respectively. The sizes of apertures 206 and 208 should be chosen so that narrow dips will be generated in the detected sweep output without appreciably distorting the output signal waveform for display.

Obviously many modifications and variations of the present invention are possible in the light of the above teachings. It is therefore to be understood that within the scope of the appended claims the invention may be practiced otherwise than specificatlly described.

What is claimed is:

1. In a system for calibrating and testing parametric amplifiers, the combination comprising;
    a. an rf detector;
    b. a voltage controlled oscillator for generating a linear fm signal,
    c. a ramp signal generator coupled to said voltage controlled oscillator and providing a gating signal and a tuning voltage for gating on said voltage controlled oscillator for the duration of the time that said tuning voltage is applied to said voltage controlled oscillator;
    d. selective switching means for selectively coupling said linear fm signal through a first circuit to said detector omitting said parametric amplifier to be tested for providing a reference calibration signal and through a second circuit to said detector including said parametric amplifier to be tested;
    e. said first and second circuits including a high Q absorptive filter frequency marker for causing narrow dips to occur at the beginning and end of the frequency band of the parametric amplifier under test;
    e. display means coupled to said ramp signal generator and to said rf detector for displaying the output signals from said detector.

2. the system of claim 1 wherein said frequency marker includes:
    a. a section of waveguide having first and second apertures of unequal sizes in opposite walls, respectively,
    b. said waveguide wall with the smaller aperture having a first tunable resonator coupled thereto,
    c. said waveguide wall with the larger aperture having a second tunable resonator larger than said first tunable resonator coupled thereto whereby very narrow spikes separated by a predetermined space will appear in the rf signal.

3. The system of claim 2 wherein the spacing between said spikes is determined by the tuning of said resonators.

4. The system of claim 1 wherein said ramp signal generator includes:
    a. first means for producing a pulse waveform,
    b. second means coupled to said first means for producing a sawtooth waveform,
    c. third means coupled to said second means for controlling the sweep slope of the sawtooth waveform,
    d. fourth means coupled to said second means for adjusting the linearity of said sawtooth waveform to match the tuning curve of said second voltage controlled oscillator,
    e. fifth means coupled to said second means for controlling the amplitude of said sawtooth waveform.

5. The system of claim 4 wherein said second means includes:
    a. a transistor having its base coupled to said first means,
    b. an operational amplifier having its positive input coupled to the collector of said transistor and its output coupled to its negative input,
    c. a variable resistor coupled between the collector of said transistor and the output of said operational amplifier for adjusting the linearity of the sawtooth wafeform.

* * * * *